US012731531B2

(12) United States Patent
Chen et al.

(10) Patent No.: US 12,731,531 B2
(45) Date of Patent: Sep. 8, 2026

(54) PIXEL DRIVING CIRCUIT AND METHOD, AND DISPLAY PANEL BASED ON PULSE WIDTH MODULATION

(71) Applicant: UNILUMIN GROUP CO., LTD., Shenzhen (CN)

(72) Inventors: Hao Chen, Shenzhen (CN); Lingjun Liu, Shenzhen (CN); Shiliang Liu, Shenzhen (CN)

(73) Assignee: UNILUMIN GROUP CO., LTD., Shenzhen (CN)

( * ) Notice: Subject to any disclaimer, the term of this patent is extended or adjusted under 35 U.S.C. 154(b) by 0 days.

(21) Appl. No.: 18/863,306

(22) PCT Filed: Jul. 18, 2023

(86) PCT No.: PCT/CN2023/107859
§ 371 (c)(1),
(2) Date: Nov. 5, 2024

(87) PCT Pub. No.: WO2024/124902
PCT Pub. Date: Jun. 20, 2024

(65) Prior Publication Data

US 2025/0299621 A1 Sep. 25, 2025

(30) Foreign Application Priority Data

Dec. 12, 2022 (CN) ......................... 202211591256.5

(51) Int. Cl.
*G09G 3/32* (2016.01)

(52) U.S. Cl.
CPC ....... *G09G 3/32* (2013.01); *G09G 2300/0819* (2013.01); *G09G 2310/08* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

2005/0017993 A1* 1/2005 Choi .................... G09G 3/2014 345/691
2006/0119553 A1* 6/2006 Akima ..................... G09G 3/32 345/77
(Continued)

FOREIGN PATENT DOCUMENTS

CN 110021264 A 7/2019
CN 111223444 A 6/2020
(Continued)

OTHER PUBLICATIONS

International Search Report in International application No. PCT/CN2023/107859, mailed on Oct. 8, 2023.
(Continued)

*Primary Examiner* — Ke Xiao
*Assistant Examiner* — Nelson Lam
(74) *Attorney, Agent, or Firm* — PV IP PC; Wei Te Chung

(57) ABSTRACT

A pixel driving circuit, a pixel driving method, and a display panel. The pixel driving circuit includes: a current driving circuit, which is used for receiving a display data signal and a display control signal, and upon receiving the display control signal, outputting a driving current, which has an intensity corresponding to the display data signal; and a grayscale control circuit, which is used for receiving the driving current, a pulse width selection signal and a pulse width modulation signal, and according to the pulse width modulation signal, driving a light emitting element for a preset duration, where the preset duration is a first duration,
(Continued)

a second duration or a third duration corresponding to the pulse width selection signal.

19 Claims, 6 Drawing Sheets

(52) U.S. Cl.
CPC ............... *G09G 2320/0247* (2013.01); *G09G 2320/0271* (2013.01); *G09G 2320/064* (2013.01)

(58) Field of Classification Search
CPC .... G09G 3/3233; G09G 3/3241; G09G 3/325; G09G 3/3258; G09G 3/3266; G09G 3/3275; G09G 3/3283; G09G 3/3291; G09G 2320/062; G09G 2320/0626; G09G 2320/0633; G09G 2320/064; G09G 2320/0653
USPC ....................................................... 345/76–83
See application file for complete search history.

(56) References Cited

U.S. PATENT DOCUMENTS

| | | | | |
|---|---|---|---|---|
| 2007/0115222 | A1* | 5/2007 | Shimada | G09G 3/3283 345/76 |
| 2008/0122758 | A1* | 5/2008 | Kim | G09G 3/3233 345/76 |
| 2011/0292027 | A1* | 12/2011 | Yang | H05B 45/46 345/82 |
| 2015/0042692 | A1* | 2/2015 | Kim | G09G 3/3233 345/82 |
| 2016/0181795 | A1* | 6/2016 | Chin | G09G 3/32 345/212 |
| 2020/0394953 | A1* | 12/2020 | Kim | G09G 3/32 |
| 2021/0225262 | A1 | 7/2021 | Liu | |
| 2021/0407376 | A1 | 12/2021 | Yue | |
| 2022/0148493 | A1 | 5/2022 | Xuan et al. | |
| 2022/0301500 | A1* | 9/2022 | Shigeta | G09G 3/32 |
| 2022/0319397 | A1* | 10/2022 | Kim | G09G 3/2003 |
| 2023/0092321 | A1* | 3/2023 | Halbritter | G09G 3/32 345/690 |

FOREIGN PATENT DOCUMENTS

| | | | |
|---|---|---|---|
| CN | 113012634 | A | 6/2021 |
| CN | 113053301 | A | 6/2021 |
| CN | 113707077 | A | 11/2021 |
| CN | 116189604 | A | 5/2023 |

OTHER PUBLICATIONS

Written Opinion of the International Search Authority in International application No. PCT/CN2023/107859, mailed on Oct. 8, 2023.
European Office Action issued in corresponding European Patent Application No. 23902112.4 dated Jun. 17, 2026, pp. 1-10.

* cited by examiner

| 8 bit | 10 bit | timing of D2 |
|---|---|---|
| 129-256 grayscale | 513-1024 grayscale |   |
| 43-128 grayscale | 169-512 grayscale |   |
| 1-42 grayscale | 1-168 grayscale |   |

PIXEL DRIVING CIRCUIT AND METHOD, AND DISPLAY PANEL BASED ON PULSE WIDTH MODULATION

RELATED APPLICATION(S)

This application is a US national phase application based upon an International Application No. PCT/CN2023/107859, filed on Jul. 18, 2023, which claims priority to and the benefit of Chinese Patent Application No. 202211591256.5, filed with on Dec. 12, 2022. The disclosures of the aforementioned applications are incorporated herein by reference in their entireties.

TECHNICAL FIELD

The present disclosure relates to the field of display technologies, and more particularly to a pixel driving circuit, a pixel driving method, and a display panel.

BACKGROUND

With the development of display technologies, the demand for display products becomes higher and higher, and glass substrate driven Sub-millimeter Light Emitting Diodes (MiniLED)/Micro Light Emitting Diodes (MicroLED) may be seamlessly spliced to display a uniform picture because of characteristics of a tiny spacing between LEDs, and be more and more popular.

SUMMARY

In an aspect, the present disclosure provides a pixel driving circuit for driving a light emitting element, where the pixel driving circuit includes:

a current driving circuit for receiving a display data signal and a display control signal, and outputting a driving current having an intensity corresponding to the display data signal when the display control signal is received; and a grayscale control circuit for receiving the driving current, a pulse width selection signal, and a pulse width modulation signal and driving the light emitting element for a preset duration according to the pulse width modulation signal; where the preset duration is a first duration, a second duration, or a third duration corresponding to the pulse width selection signal.

In an embodiment of the present disclosure, the grayscale control circuit includes a first pulse width selection circuit and a second pulse width selection circuit each for receiving the driving current, the pulse width selection signal, and the pulse width modulation signal; and the first pulse width selection circuit and the second pulse width selection circuit alternately drive the light emitting element for a total duration of the first duration according to the pulse width modulation signal under the control of the pulse width selection signal; or the first pulse width selection circuit drives the light emitting element for the second duration according to the pulse width modulation signal under the control of the pulse width selection signal; or the second pulse width selection circuit drives the light emitting element for the third duration according to the pulse width modulation signal under the control of the pulse width selection signal, where the first duration is a sum of the second duration and the third duration.

In an embodiment of the present disclosure, the first pulse width selection circuit includes a first transistor and a first pulse width selection sub-circuit; the first transistor is connected to the current driving circuit, the light emitting element, and the first pulse width selection sub-circuit, respectively; and the first pulse width selection sub-circuit is configured to receive the pulse width selection signal and the pulse width modulation signal and control the first transistor to turn on/off connection between the current driving circuit and the light emitting element according to the pulse width modulation signal under the control of the pulse width selection signal;

the second pulse width selection circuit includes a second transistor and a second pulse width selection sub-circuit; the second transistor is connected to the current driving circuit, the light emitting element, and the second pulse width selection sub-circuit, respectively; and the second pulse width selection sub-circuit is configured to receive the pulse width selection signal and the pulse width modulation signal and control the second transistor to turn on/off connection between the current driving circuit and the light emitting element according to the pulse width modulation signal under the control of the pulse width selection signal; and the first transistor is a first type of transistor and the second transistor is a second type of transistor.

In an embodiment of the present disclosure, the first pulse width selection sub-circuit includes: a third transistor, where an input terminal of the third transistor is configured to receive the pulse width selection signal, a controlled terminal of the third transistor is configured to receive a first scan signal, and an output terminal of the third transistor is connected to a controlled terminal of a fourth transistor and a first terminal of a first capacitor, respectively; the fourth transistor, where an input terminal of the fourth transistor is configured to receive the pulse width modulation signal, and an output terminal of the fourth transistor is connected to the first transistor; and the first capacitor, where a second terminal of the first capacitor is configured to receive a voltage stabilizing signal.

In an embodiment of the present disclosure, the second pulse width selection sub-circuit includes a fifth transistor, where an input terminal of the fifth transistor is configured to receive the pulse width selection signal, a controlled terminal of the fifth transistor is configured to receive a second scan signal, and an output terminal of the fifth transistor is connected to a controlled terminal of a sixth transistor and a first terminal of a second capacitor, respectively; the sixth transistor, where an input terminal of the sixth transistor is configured to receive the pulse width modulation signal, and an output terminal of the sixth transistor is connected to the second transistor; and the second capacitor, where a second terminal of the second capacitor is configured to receive a voltage stabilizing signal.

In an embodiment of the present disclosure, the current driving circuit includes a reset circuit, a writing compensation circuit, and a driving circuit, where the writing compensation circuit is connected to the reset circuit, the driving circuit, and the grayscale control circuit, respectively;

the reset circuit is configured to receive a reset signal and a first scan signal and reset the writing compensation circuit according to the first scan signal;

the writing compensation circuit is further configured to receive a display data signal and write the display data signal according to the second scan signal; and the driving circuit is configured to receive a first voltage and a display control signal and control the writing compensation circuit to output a driving current having an intensity corresponding to the display data signal according to the first voltage and the display control signal.

In an embodiment of the present disclosure, the writing compensation circuit includes a data writing transistor and a compensation sub-circuit, where a controlled terminal of the data writing transistor is configured to receive the second scan signal, an input terminal of the data writing transistor is configured to receive the display data signal, and an output terminal of the data writing transistor is connected to the compensation sub-circuit; and the compensation sub-circuit is connected to the driving circuit to receive a first voltage output by the driving circuit, and further configured to receive the second scan signal and perform voltage compensation according to the first voltage and the display data signal under the control of the second scan signal.

In an embodiment of the present disclosure, the compensation sub-circuit includes a seventh transistor, an eighth transistor, and a third capacitor, where a controlled terminal of the seventh transistor is configured to receive the second scan signal, an input terminal of the seventh transistor is connected to an output terminal of the eighth transistor, an output terminal of the seventh transistor, a first terminal of the third capacitor and a controlled terminal of the eighth transistor are respectively connected to the reset circuit, a second terminal of the third capacitor is configured to receive the voltage stabilizing signal, and an input terminal of the eighth transistor is connected to an output terminal of the writing transistor.

In an embodiment of the present disclosure, the reset circuit includes a reset transistor, where an input terminal of the reset transistor is connected to a reset signal inputting terminal for outputting the reset signal, a controlled terminal of the reset transistor is connected to a first scan signal inputting terminal for outputting the first scan signal, and an output terminal of the reset transistor is connected to the output terminal of the seventh transistor in the writing compensation circuit.

In an embodiment of the present disclosure, the driving circuit includes a driving transistor, where an input terminal of the driving transistor is connected to a first voltage terminal, a controlled terminal of the driving transistor is connected to a display control signal inputting terminal for outputting the display control signal, and an output terminal of the driving transistor is connected to the input terminal of the eighth transistor in the writing compensation circuit.

In an embodiment of the present disclosure, the third transistor and the fifth transistor are of the same type.

In an embodiment of the present disclosure, the second duration is greater than or less than the third duration to perform three levels of grayscale adjustment; or the second duration is equal to the third duration to perform two levels of grayscale adjustment.

In an embodiment of the present disclosure, the pulse width modulation signal has a period $T=n((t\mathbf{1}+t\mathbf{2}))$, $n\geq 3$ and is an integer multiple of 3, where t1 is a duration for a reset phase and t2 is a duration for a writing compensation phase.

In another aspect, the present disclosure further provides a pixel driving method for the pixel driving circuit as described above, including:

the current driving circuit receiving a display data signal and a display control signal, and outputting a driving current having an intensity corresponding to the display data signal when the display control signal is received; and the grayscale control circuit receiving the driving current, a pulse width selection signal, and a pulse width modulation signal and driving the light emitting element for a preset duration according to the pulse width modulation signal; where the preset duration is a first duration, a second duration, or a third duration corresponding to the pulse width selection signal.

In yet another aspect, the present disclosure further provides a display panel, including: a plurality of light emitting elements and a plurality of pixel circuits each for driving corresponding one of the light emitting elements, where each of the pixel circuits is the pixel driving circuit as described above.

Details of various embodiments of the present disclosure are set forth in the accompanying drawings and the description below. Other features, problems to be solved, and advantages of the present disclosure will be readily apparent to those skilled in the art from the description, drawings, and claims.

DESCRIPTION OF THE DRAWINGS

In order to more clearly illustrate the technical solutions in embodiments of the present disclosure or related art, the accompanying drawings depicted in the description of the embodiments or the related art will be briefly described below. It will be apparent that the accompanying drawings in the following description are merely some embodiments of the present disclosure and do not constitute a limitation on the protection scope of the present application and the disclosure of the description.

DETAILED DESCRIPTION

To make objectives, technical solutions and advantages of the present disclosure more clear and definite, the present disclosure is illustrated in detail below by referring to the accompanying drawings and illustrating the embodiments. It should be understood that the specific implementations described here are only used to explain the present disclosure, and are not used to limit the present disclosure.

The glass substrate driving technology known to the applicant drives the light emitting element by adjusting an amplitude of a current pulse to adjust the brightness. However, when the above driving structure drives the light emitting element to display a low grayscale, a low current density corresponding to the low grayscale is achieved, and the MiniLED/MicroLED may have an uneven brightness under the low current condition, which affects the display effect of the display panel and cannot meet the requirements of people for a high-quality display product.

Figure 1:
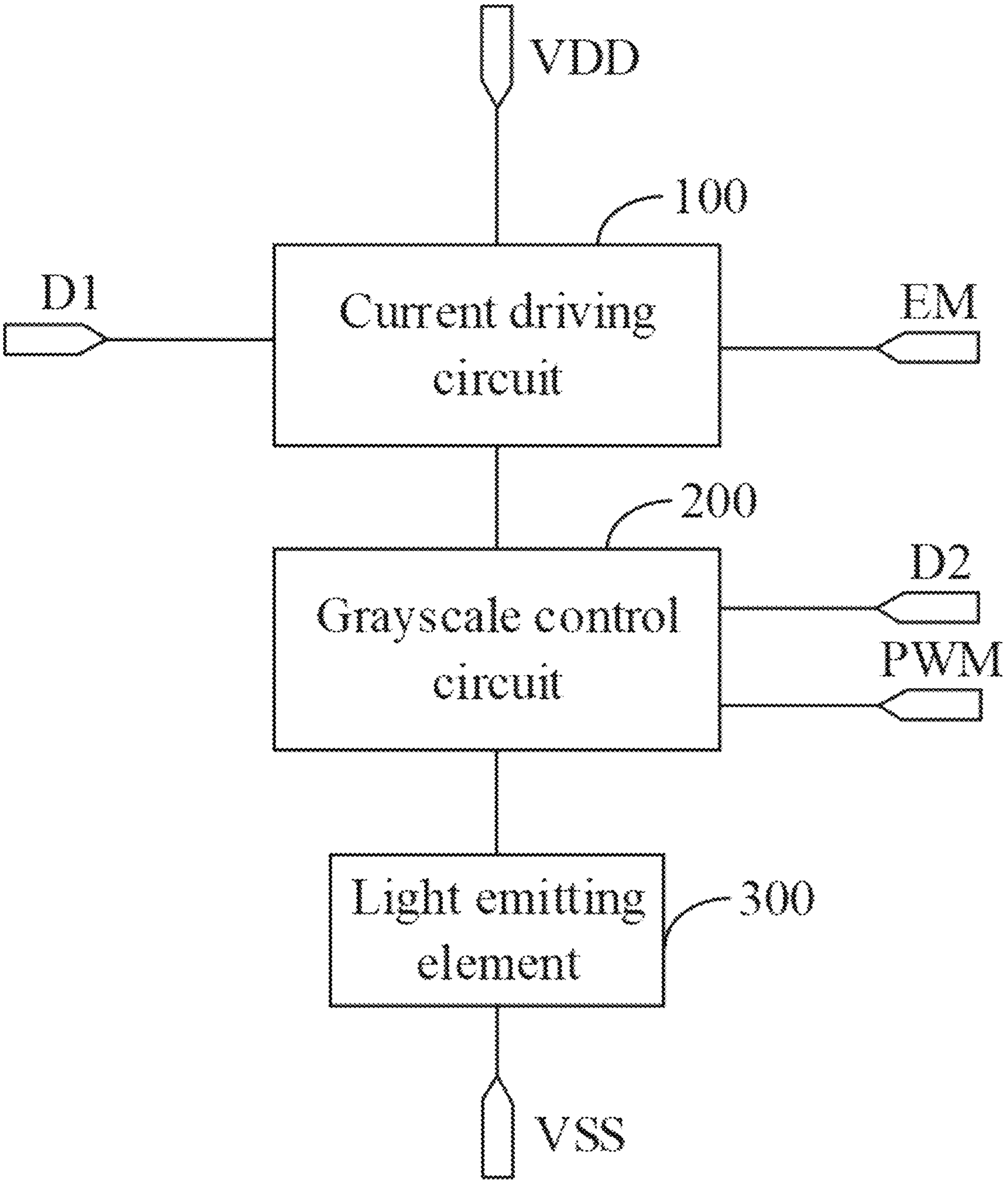
FIG. 1 is a schematic block diagram of a pixel driving circuit according to an embodiment of the present disclosure.

In an embodiment, a pixel driving circuit is provided, including a current driving circuit 100 and a grayscale control circuit 200, as shown in FIG. 1. The current driving circuit 100 is configured to receive a display data signal D1 and a display control signal EM, and to output a driving current having an intensity corresponding to the display data signal D1 when the display control signal EM is received. The grayscale control circuit 200 is configured to receive the driving current, a pulse width selection signal D2, and a pulse width modulation signal PWM, and drive a light emitting element 300 for a preset duration according to the pulse width modulation signal PWM; where the preset duration is a first duration, a second duration, or a third duration corresponding to the pulse width selection signal D2.

The light emitting element 300 may be the MiniLED or the MicroLED, or may be another type of light emitting diode such as an Organic Light Emitting Diode (OLED). In a practical application, the structure of the light emitting element 300 needs to be designed and determined according to the actual application environment, and is not limited herein. For ease of explanation, the light emitting element 300 includes, for example, a sub-millimeter light emitting diode D having an anode connected to the grayscale control circuit 200 and a cathode connected to a low voltage terminal VSS.

Specifically, the current driving circuit 100 is connected to a first voltage terminal VDD, a display data signal inputting terminal, and a display control signal inputting terminal, respectively, receives the display data signal D1 of the display data signal inputting terminal, receives the display control signal EM of the display control signal inputting terminal, generates and outputs a driving current to the grayscale control circuit 200 according to the control of the display control signal EM, and generates an intensity of the driving current according to the control of the display data signal D1.

The grayscale control circuit 200 is connected to the current driving circuit 100, the light emitting element 300, a pulse width selection signal inputting terminal, and a pulse width modulation signal inputting terminal, receives the driving current, and drives or stops driving the light emitting element 300 according to the received pulse width modulation signal PWM. In a frame period, a total duration for the grayscale control circuit 200 driving the light emitting element 300 may be a first duration, a second duration, or a third duration, and a specific duration is controlled by the received pulse width selection signal D2. When the pulse width selection signal D2 corresponds to a high grayscale, the total duration of the driving light emitting element 300 is the first duration. When the pulse width selection signal D2 corresponds to a medium grayscale, the total duration of the driving light emitting element 300 is the second duration. When the pulse width selection signal D2 corresponds to the low grayscale, the total duration of driving the light emitting element 300 is the third duration. Correspondingly, the first duration is greater than the second duration, and the second duration is greater than the third duration, where the high grayscale, the medium grayscale, and the low grayscale are divided in combination with a situation.

It should be noted that, when the light emitting element 300 is driven with a duration, such as, the first duration, it is necessary to reduce the intensity of the driving current if the low grayscale display is to be realized, and a voltage gradient between the grayscales is smaller. When the light emitting element 300 is driven with two levels of adjustment, i.e., two kinds of durations, the intensity of the driving current can be increased, the voltage gradient between the grayscales can be increased, thereby improving the display effect. In the present embodiment, it is possible to drive the light emitting element 300 with three levels of adjustment, i.e., three kinds of durations, so that a voltage value of the display data signal D1 is relatively higher, the driving current is larger, the voltage gradient between the grayscales is larger, the brightness difference between the grayscales is larger, and the display effect is better and the display is more stable.

The pixel driving circuit still has a current pulse amplitude dimming function, and is capable of outputting driving currents of different intensities and driving the light emitting element 300 with different durations to display different grayscales, so that the light emitting element 300 can no longer be in a low current when displaying the grayscales, thereby avoiding a picture flickering phenomenon when displaying the low grayscales. In particular, when the light emitting element 300 is selected to use the sub-millimeter light emitting diode (MiniLED) or the micro light emitting diode (MicroLED), the display effect of the display panel in the low grayscale can be significantly improved. In addition, since the pixel driving circuit can drive the light emitting element 300 with three durations, multi-grayscale display is realized by three levels of pulse width modulation, and the display effect is better.

Figure 2:
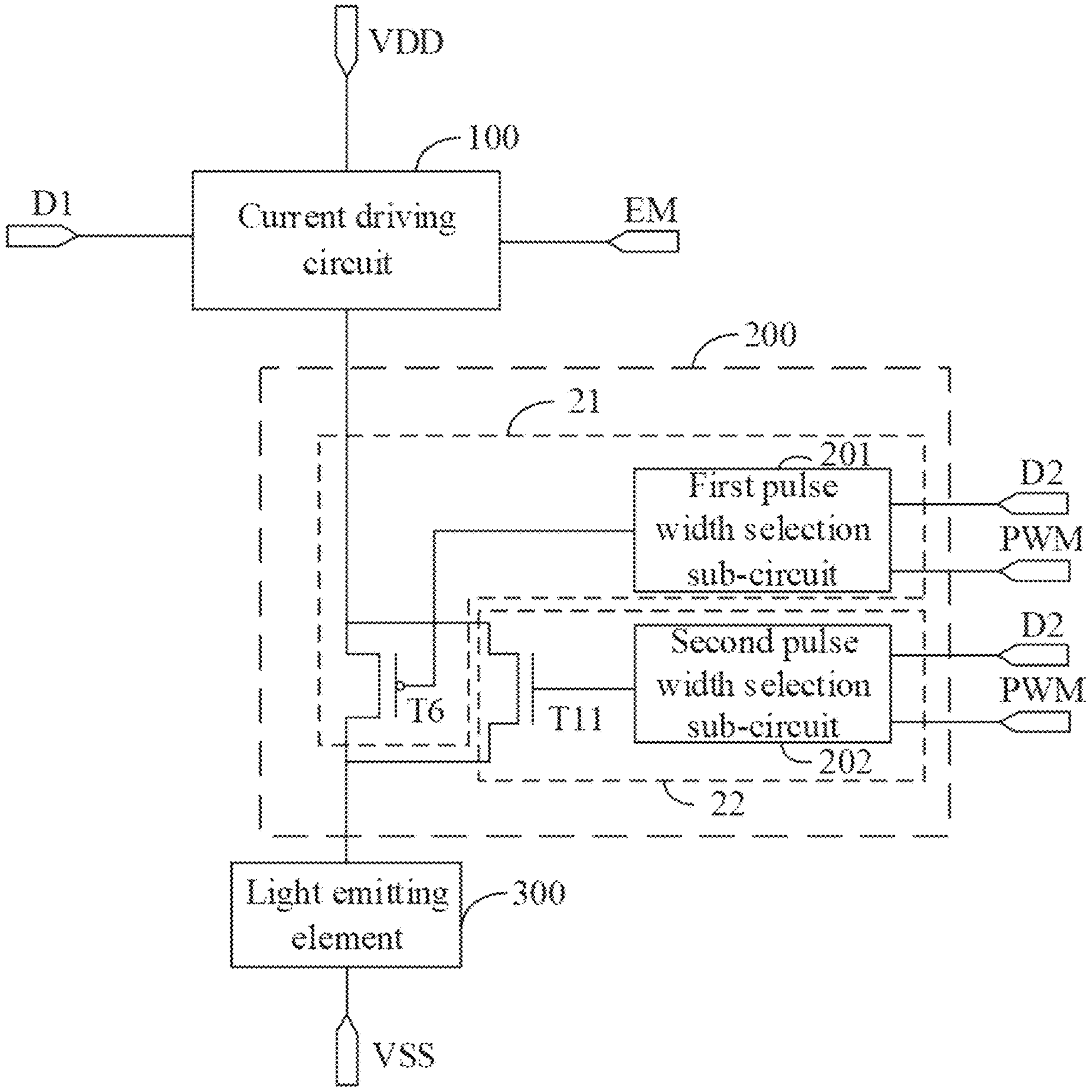
FIG. 2 is a schematic block diagram of a pixel driving circuit according to another embodiment of the present disclosure.

In an embodiment, as shown in FIG. 2, the grayscale control circuit 200 includes a first pulse width selection circuit 21 and a second pulse width selection circuit 22, where each of the first pulse width selection circuit 21 and the second pulse width selection circuit 22 receives the driving current, a pulse width selection signal D2, and a pulse width modulation signal PWM. The first pulse width selection circuit 21 and the second pulse width selection circuit 22 alternately drive the light emitting element 300 for a total duration of the first duration according to the pulse width modulation signal PWM under the control of the pulse width selection signal D2. Alternatively, the first pulse width selection circuit 21 drives the light emitting element 300 for the second duration according to the pulse width modulation signal PWM under the control of the pulse width selection signal D2. Alternatively, the second pulse width selection circuit 22 drives the light emitting element 300 for the third duration according to the pulse width modulation signal PWM under the control of the pulse width selection signal D2.

In the present embodiment, the first pulse width selection circuit 21 and the second pulse width selection circuit 22 are both connected to the current driving circuit 100, the light emitting element 300, the pulse width selection signal inputting terminal, and the pulse width modulation signal inputting terminal to determine whether to drive the light emitting element 300 according to the pulse width modulation signal PWM under the control of the pulse width selection signal D2.

In an embodiment, the second duration and the third duration are related to a duty cycle of the pulse width modulation signal PWM, the second duration and the third duration need to be specifically determined according to the grayscale range to be displayed, and the first duration is a sum of the third duration and the second duration. For example, when it is necessary to display the high grayscale, the medium grayscale, and the low grayscale, it is possible to set the second duration to be longer than the third duration, and the second pulse width selection circuit 22 controls the total duration of turning on the current driving circuit 100 and the light emitting element 300 to be the third duration, thereby realizing the low grayscale display; the first pulse width selection circuit 21 controls the total duration of turning on the current driving circuit 100 and the light emitting element 300 to be the second duration, thereby realizing the medium grayscale display; and the first pulse width selection circuit 21 and the second pulse width selection circuit 22 alternately control the total duration of turning on the current driving circuit 100 and the light emitting element 300 to be the first duration, thereby realizing the high grayscale display. Therefore, the three levels of grayscale adjustment is realized according to the pulse width modulation signal PWM.

It should be understood that it is also possible to adjust the duty cycle of the pulse width modulation signal PWM according to actual control requirements, so that the second duration is equal to the third duration and the first duration is the sum of the third duration and the second duration, thereby realizing the two levels of grayscale adjustment.

In an embodiment, the first pulse width selection circuit 21 includes a first transistor T6 and a first pulse width selection sub-circuit 201; the first transistor T6 is connected to the current driving circuit 100, the light emitting element 300, and the first pulse width selection sub-circuit 201, respectively; and the first pulse width selection sub-circuit 201 is configured to receive the pulse width selection signal D2 and the pulse width modulation signal PWM and control the first transistor T6 to turn on/off connection between the current driving circuit 100 and the light emitting element 300 according to the pulse width modulation signal PWM under the control of the pulse width selection signal D2. The second pulse width selection circuit 22 includes a second transistor T11 and a second pulse width selection sub-circuit 202; the second transistor T11 is connected to the current driving circuit 100, the light emitting element 300, and the second pulse width selection sub-circuit 202, respectively; and the second pulse width selection sub-circuit 202 is configured to receive the pulse width selection signal D2 and the pulse width modulation signal PWM and control the second transistor T11 to turn on/off connection between the current driving circuit 100 and the light emitting element 300 according to the pulse width modulation signal PWM under the control of the pulse width selection signal D2. The first transistor T6 is a first type of transistor and the second transistor T11 is a second type of transistor.

The first type of transistor includes an N-type transistor or a P-type transistor, the second type of transistor includes a P-type transistor or an N-type transistor, and the second type of transistor is different from the first type of transistor. That is, when the first type of transistor is the N-type transistor, the second type of transistor is the P-type transistor, and when the first type of transistor is the P-type transistor, the second type of transistor is the N-type transistor. For ease of illustration, an example in which the first transistor T6 is the P-type transistor and the second transistor T11 is the N-type transistor is taken in the present embodiment. The type of the transistor is not necessarily limited, and may be a Thin Film Transistor (TFT), where the thin film transistor may be a thin film transistor of a bottom gate structure or a thin film transistor of a top gate structure, so long as the above function can be realized.

An input terminal of the first transistor T6 is connected to the current driving circuit 100, an output terminal of the first transistor T6 is connected to the light emitting element 300, and a controlled terminal of the first transistor T6 is connected to the first pulse width selection sub-circuit 201. The first pulse width selection sub-circuit 201 is connected to the pulse width selection signal inputting terminal and the pulse width modulation signal inputting terminal, respectively, and receives the pulse width selection signal D2 and the pulse width modulation signal PWM. The first pulse width selection sub-circuit 201 also outputs the pulse width modulation signal PWM to the controlled terminal of the first transistor T6 under the control of the pulse width selection signal D2. When the first transistor T6 receives the pulse width modulation signal PWM, the connection between the current driving circuit 100 and the light emitting element 300 is turned on/off according to the pulse width modulation signal PWM, so that the light emitting element 300 displays a grayscale corresponding to the driving current according to the driving current. Since the first transistor T6 is the P-type transistor, the first transistor T6 is turned on when the pulse width modulation signal PWM is at a low level, and the first pulse width selection sub-circuit 201 controls a light emission duration of the light emitting element 300 to be the total duration when the pulse width modulation signal PWM is at the low level.

An input terminal of the second transistor T11 is connected to the current driving circuit 100, an output terminal of the second transistor T11 is connected to the light emitting element 300, and a controlled terminal of the second transistor T11 is connected to the second pulse width selection sub-circuit 202. The second pulse width selection sub-circuit 202 is connected to the pulse width selection signal inputting terminal and the pulse width modulation signal inputting terminal, respectively, and receives the pulse width selection signal D2 and the pulse width modulation signal PWM. The second pulse width selection sub-circuit 202 also outputs the pulse width modulation signal PWM to the controlled terminal of the second transistor T11 under the control of the pulse width selection signal D2. When the second transistor T11 receives the pulse width modulation signal PWM, the connection between the current driving circuit 100 and the light emitting element 300 is turned on/off according to the pulse width modulation signal PWM, so that the light emitting element 300 displays a grayscale corresponding to the driving current according to the driving current. Since the second transistor T11 is the N-type transistor, the second transistor T11 is turned on when the pulse width modulation signal PWM is at a high level, and the second pulse width selection sub-circuit 202 controls a light emission duration of the light emitting element 300 to be the total duration when the pulse width modulation signal PWM is at the high level.

Further, the first pulse width selection sub-circuit 201 is connected to a first scan signal inputting terminal to receive a first scan signal G1; and the second pulse width selection sub-circuit 202 is connected to a second scan signal inputting terminal to receive a second scan signal G2. The first pulse width selection sub-circuit 201 receives the pulse width selection signal D2 according to the control of the first scan signal G1, and further receives the pulse width modulation signal PWM, and does not receive the pulse width selection signal D2 when the first scan signal G1 is not received. The second pulse width selection sub-circuit 202 receives the pulse width selection signal D2 according to the control of the second scan signal G2, and further receives the pulse width modulation signal PWM, and does not receive the pulse width selection signal D2 when the second scan signal G2 is not received. Therefore, a level of the pulse width control signal D2 received by the first pulse width selection sub-circuit 201 and the second pulse width selection sub-circuit 202 can be controlled by controlling the timing of the first scan signal G1 and the second scan signal G2, so that three levels of control is realized.

Figure 3:
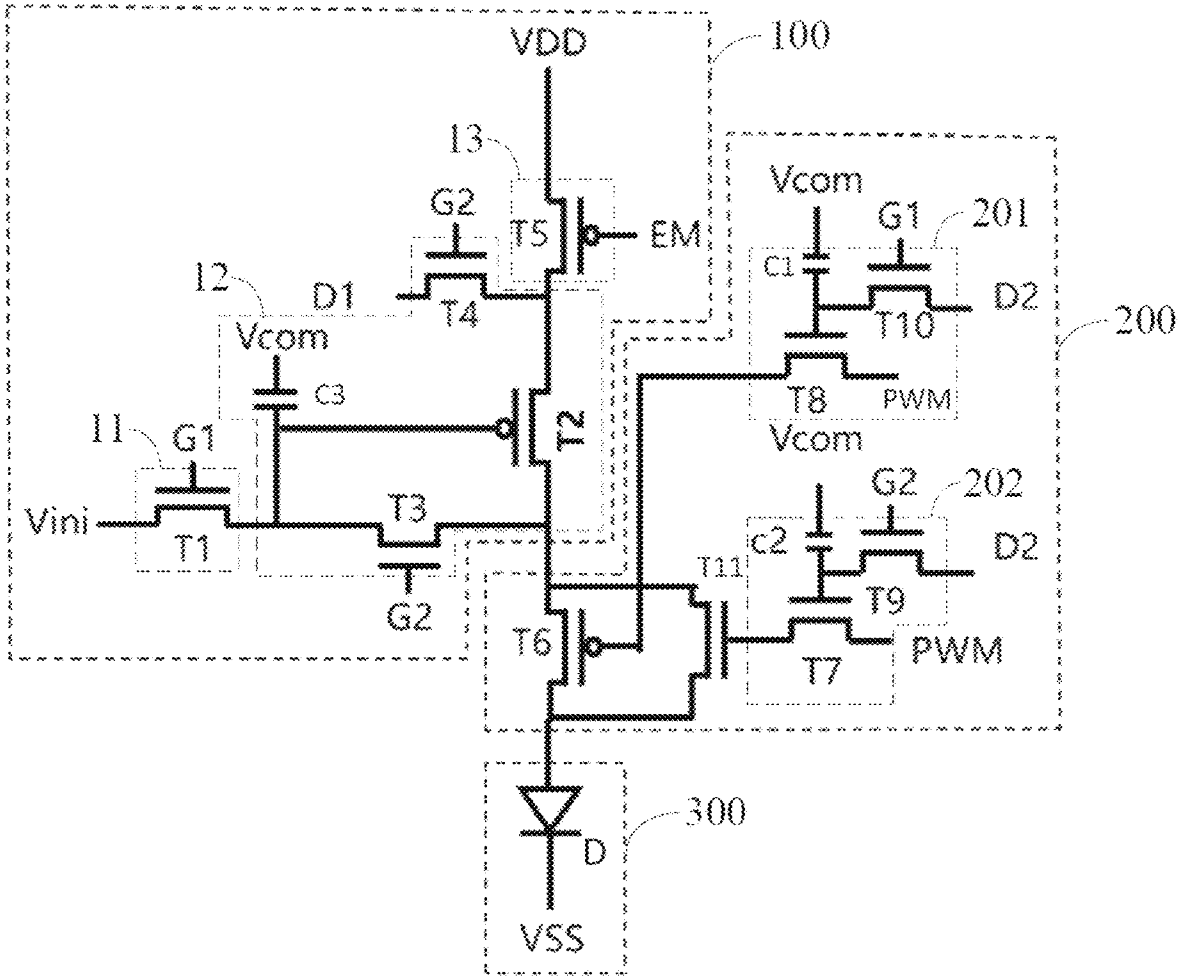
FIG. 3 is a circuit structure diagram of a pixel driving circuit according to an embodiment of the present disclosure.

In an embodiment, as shown in FIG. 3, the first pulse width selection sub-circuit 201 includes: a third transistor T10, where an input terminal of the third transistor T10 is connected to the pulse width selection signal inputting terminal to receive the pulse width selection signal D2, a controlled terminal of the third transistor T10 is connected to the first scan signal inputting terminal to receive the first scan signal G1, and an output terminal of the third transistor T10 is connected to a controlled terminal of a fourth transistor T8 and a first terminal of a first capacitor C1, respectively; the fourth transistor T8, where an input terminal of the fourth transistor T8 is connected to the pulse width modulation signal inputting terminal to receive the pulse width modulation signal PWM, and an output terminal of the fourth transistor T8 is connected to the controlled terminal of the first transistor T6; and the first capacitor C1, where a second terminal of the first capacitor C1 is connected to a voltage stabilizing signal Vcom inputting terminal to receive a voltage stabilizing signal Vcom.

The first scan signal G1, the second scan signal G2, the pulse width selection signal D2, the display data signal D1, the display control signal EM, and the voltage stabilizing signal Vcom may be generated by a driving Integrated Circuit Chip (IC chip), and the voltage stabilizing signal Vcom may be a first voltage of the first voltage terminal VDD or a second voltage of the low voltage terminal VSS.

In an embodiment, the second pulse width selection sub-circuit includes a fifth transistor T9, where an input terminal of the fifth transistor T9 is connected to a pulse width selection signal inputting terminal to receive the pulse width selection signal, a controlled terminal of the fifth transistor T9 is connected to a second scan signal inputting terminal to receive the second scan signal, and an output terminal of the fifth transistor T9 is connected to a controlled terminal of a sixth transistor T7 and a first terminal of a second capacitor, respectively; the sixth transistor T7, where an input terminal of the sixth transistor T7 is connected to a pulse width modulation signal inputting terminal to receive the pulse width modulation signal PWM, and an output terminal of the sixth transistor T7 is connected to the second transistor T11; and the second capacitor C2, where a second terminal of the second capacitor C2 is connected to the voltage stabilizing signal Vcom inputting terminal to receive the voltage stabilizing signal Vcom.

The third transistor T10 and the fifth transistor T9 are of the same type and both are N-type transistors. When high levels are received by the third transistor T10 and the fifth transistor T9, the third transistor T10 and the fifth transistor T9 are turned on. The third transistor T10 and the fifth transistor T9 are turned on in sequence according to the first scan signal G1 and the second scan signal G2, so that the potential of the pulse width selection signal D2 when the first scan signal G1 is received is stored in the first capacitor C1, and the potential of the pulse width selection signal D2 when the second scan signal G2 is received is stored in the second capacitor C2. The fourth transistor T8 and the sixth transistor T7 are of the same type. The fourth transistor T8 and the sixth transistor T7 may both be N-type transistors or P-type transistors, and need to be set in combination with the timing of the pulse width selection signal D2.

Figure 4:
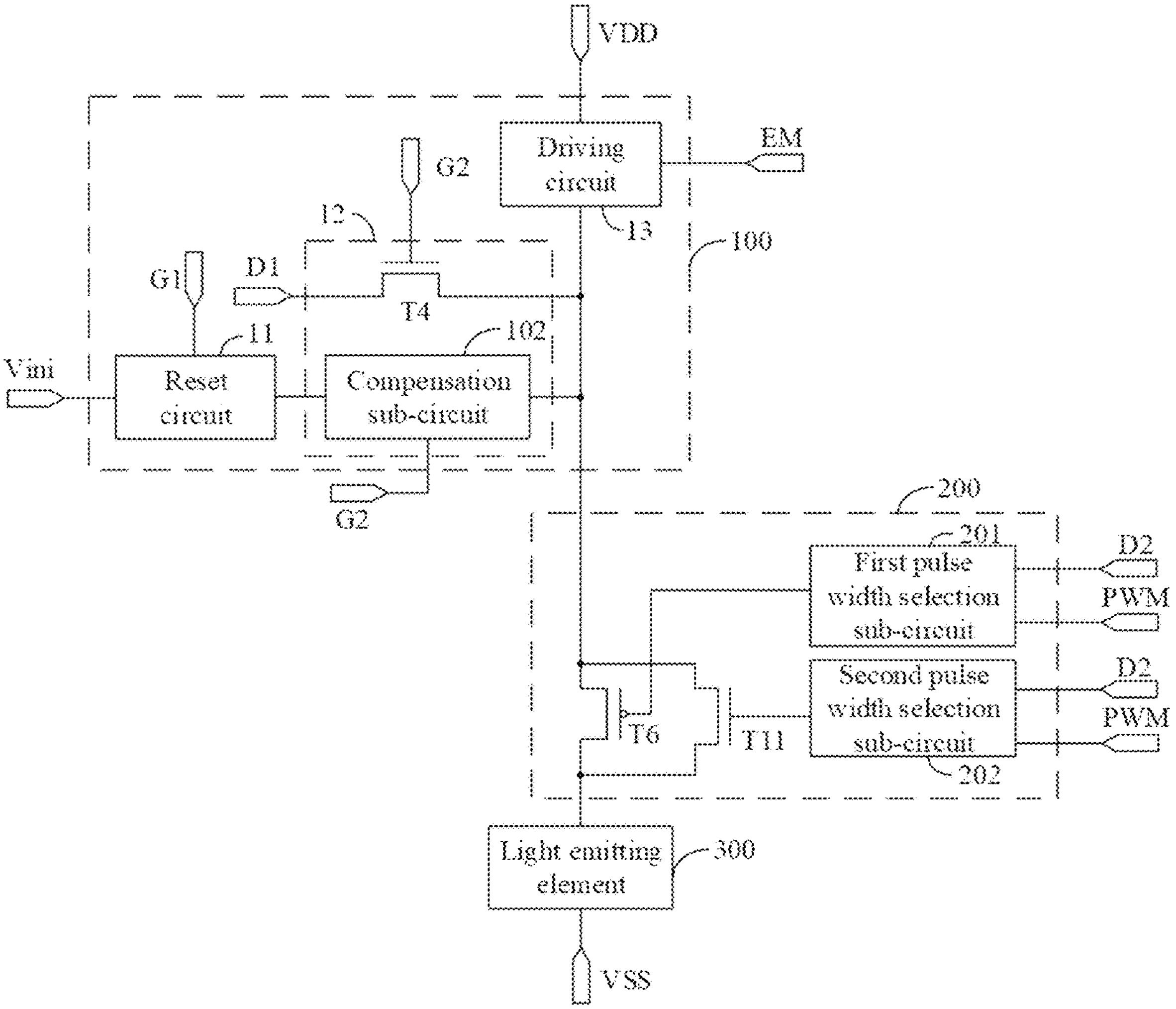
FIG. 4 is a schematic block diagram of a pixel driving circuit according to yet another embodiment of the present disclosure.

In an embodiment, as shown in FIG. 4, the current driving circuit 100 includes a reset circuit 11, a writing compensation circuit 12, and a driving circuit 13. The writing compensation circuit 12 is connected to the reset circuit 11, the drive circuit 13, and the grayscale selection circuit 200, respectively. The writing compensation circuit 12 is further configured to connect the display data signal inputting terminal and the second scan signal inputting terminal to receive the display data signal D1 and the second scan signal G2. The reset circuit 11 is connected to the reset signal inputting terminal and the first scan signal inputting terminal to receive the reset signal Vini and the first scan signal G1. The driving circuit 13 is connected to the first voltage terminal VDD and the display control signal inputting terminal to receive the first voltage VDD and the display control signal EM. The reset circuit 11 is configured to reset the writing compensation circuit 12 according to the first scan signal G1, the writing compensation circuit 12 is configured to write the display data signal D1 according to the second scan signal G2, and the driving circuit 13 controls the writing compensation circuit 12 to output a drive current having an intensity corresponding to the display data signal D1 according to the first voltage VDD and the display control signal EM.

Specifically, when the first scan signal G1 is received by the reset circuit 11, the reset circuit 11 is turned on, so that the potential of the writing compensation circuit 12 at the end of one period is pulled down to the potential of the reset signal Vini. The writing compensation circuit 12 writes the display data signal D1 according to the second scan signal G2, and performs voltage compensation according to the written display data signal D1. When the display control signal EM is received by the driving circuit 13, the first voltage terminal VDD and the writing compensation circuit 12 are turned on, so that the writing compensation circuit 12 outputs a driving current having an intensity corresponding to the display data signal D1 to the light emitting element 300.

In an embodiment, the writing compensation circuit 12 includes a data writing transistor T4 and a compensation sub-circuit 102, where a controlled terminal of the data writing transistor T4 is configured to connect a second scan signal inputting terminal to receive the second scan signal G2, an input terminal of the data writing transistor T4 is configured to connected a display data signal inputting terminal to receive the display data signal D1, and an output terminal of the data writing transistor T4 is connected to the compensation sub-circuit 102. The compensation sub-circuit is connected to the driving circuit 13 to receive a first voltage output by the driving circuit 13, and the compensation sub-circuit is further configured to connect a second scan signal inputting terminal to receive the second scan signal G2 and perform compensation according to the first voltage VDD and the display data signal D1 under the control of the second scan signal G2.

In an embodiment, referring back to FIG. 3, the compensation sub-circuit 102 includes a seventh transistor T3, an eighth transistor T2, and a third capacitor C3, where a controlled terminal of the seventh transistor T3 is configured to connect a second scan signal inputting terminal to receive the second scan signal G2, an input terminal of the seventh transistor T3 is connected to an output terminal of the eighth transistor T2, an output terminal of the seventh transistor T3, a first terminal of the third capacitor C3 and a controlled terminal of the eighth transistor T2 are respectively connected to the reset circuit 11, a second terminal of the third capacitor C3 is configured to receive the voltage stabilizing signal Vcom, and an input terminal of the eighth transistor T2 is connected to an output terminal of the data writing transistor T4.

The output terminal of the seventh transistor T3, the first terminal of the third capacitor C3, and the controlled terminal of the eighth transistor T2 are respectively connected to the output terminal of the reset transistor T1, and the input terminal of the eighth transistor T2 is further connected to the driving circuit 13.

Configuration of the reset circuit 11, the writing compensation circuit 12, and the driving circuit 13 may be set according to actual requirements. In an embodiment, the reset circuit 11 includes a reset transistor T1, where an input terminal of the reset transistor T1 is connected to a reset signal Vini inputting terminal, a controlled terminal of the reset transistor T1 is connected to the first scan signal inputting terminal, and an output terminal of the reset transistor T1 is connected to the output terminal of the seventh transistor T3 in the writing compensation circuit 12. The driving circuit 13 includes a driving transistor T5, where an input terminal of the driving transistor T5 is connected to the first voltage terminal VDD, a controlled terminal of the driving transistor T5 is connected to the display control signal inputting terminal, and an output terminal of the driving transistor T5 is connected to the input terminal of the eighth transistor T2 in the writing compensation circuit 12.

Figure 5:
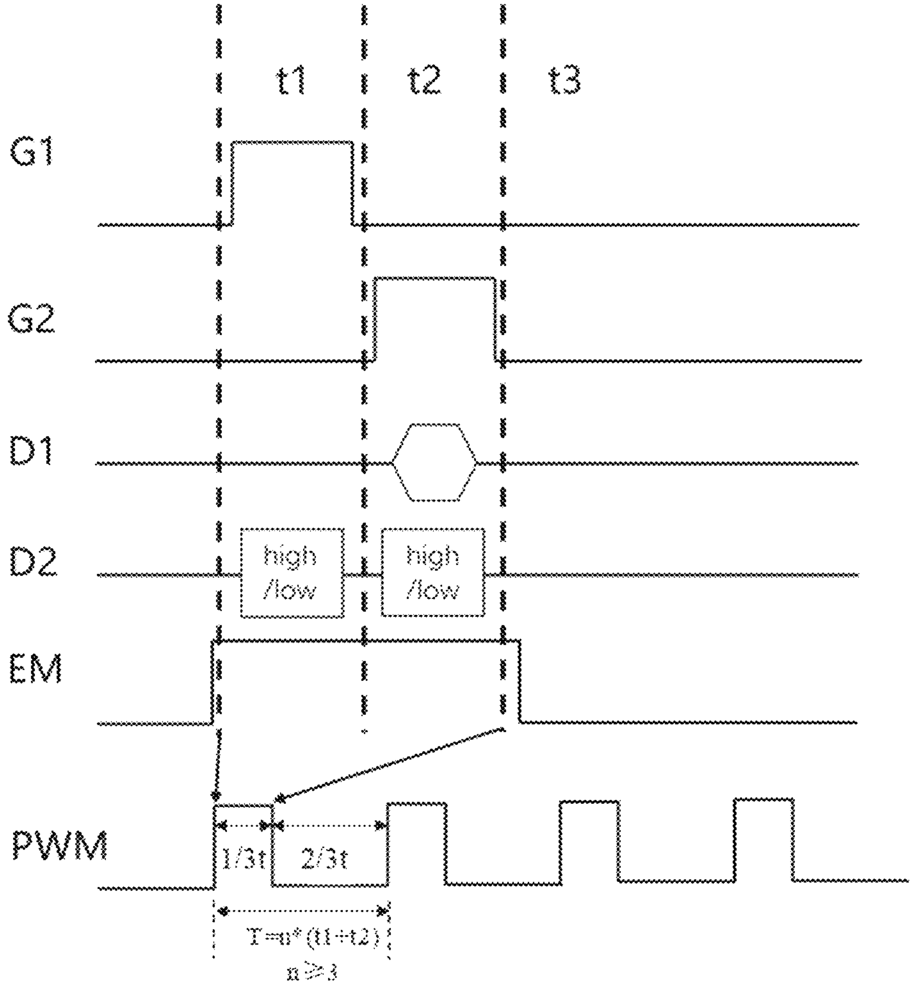
FIG. 5 is a timing diagram of a frame period of a pixel driving circuit according to an embodiment of the present disclosure.

For ease of illustration, an operation process of the pixel driving circuit in one frame period will be described in connection with an operation timing diagram shown in FIG. 5.

In a first phase t1, i.e., a reset phase, the first scan signal G1 is at a high level and the second scan signal G2 is at a low level; the reset transistor T1 is turned on, and the reset signal Vini is written as a low level to remove the charge stored on the third capacitor C3 in a previous frame, while the eighth transistor T2 is turned on. Meanwhile, the third transistor T10 is also in a turned-on state, and the pulse width selection signal D2 is written to the gate (i.e., the controlled terminal) of the fourth transistor T8 and stored in the first capacitor C1.

In a second phase t2, i.e., a writing compensation phase, the first scan signal G1 becomes at a low level, and the second scan signal G2 becomes at a high level. The seventh transistor T3 and the data writing transistor T4 are turned on, the display data signal D1 is charged to the gate of the eighth transistor T2 through the eighth transistor T2, the seventh transistor T3, and the data writing transistor T4, and is stored on the third capacitor C3 when the potential of the gate is Vdata+Vth (that is, the sum of the voltage of the display data signal D1 and the threshold voltage of the eighth transistor T2), and the eighth transistor T2 is turned off. Meanwhile, the fifth transistor T9 is turned on, and the pulse width selection signal D2 is written to the gate of the sixth transistor T7 and stored on the second capacitor C2.

The display panel may support different grayscales. When the total grayscales are 8 bit and 10 bit, the timing of the pulse width selection signal D2 corresponding to the different grayscales may be set according to actual situations. In an embodiment, as shown in FIG. 5, when the grayscales are 129-256 grayscales of 8 bit and 513-1024 grayscale of 10 bit, the potential of the pulse width selection signal D2 in each of the phases t1 and t2 is at the high level; when the grayscales are 43-128 grayscales of 8 bit and 169-512 grayscale of 10 bit, the potential of the pulse width selection signal D2 in the phase t1 is at the high level and the potential of the pulse width selection signal D2 in the phase t2 is at the low level; and when the grayscales are 1-43 grayscales of 8 bit and 1-169 grayscale of 10 bit, the potential of the pulse width selection signal D2 in the phase t1 is at the low level and the potential of the pulse width selection signal D2 in the phase t2 is at the high level.

In a third phase t3, i.e., a light emitting phase, the potential of the display control signal EM is at a low level, and the sixth transistor T7 is turned on. The first transistor T6 and the second transistor T11 may control whether or not the pulse width modulation signal PWM is written according to the potentials of the gates of the sixth transistor T7 and the fourth transistor T8 respectively stored on the second capacitor C2 and the first capacitor C1 in the phases t1 and t2. When the gate of the fourth transistor T8 is at a high potential, the gate of the first transistor T6 is written with a PWM signal, and when the PWM signal is at a low level, the first transistor T6 is turned on. When the gate of the sixth transistor T7 is at a high potential, the gate of the second transistor T11 is written with the pulse width modulation signal PWM signal, and when the pulse width modulation signal PWM signal is at a high level, the second transistor T11 is turned on. When the first transistor T6 or the second transistor T11 is turned on, a current on a current path is determined by the potential stored at the gate of the eighth transistor T8. The driving current is $I=K(V_{gs}-V_{th})^2=K(V_{data}+V_{th}-VDD-V_{th})^2=K(V_{data}-VDD)^2$, where Vgs represents a gate-source voltage of the eighth transistor T2, Vth represents the threshold voltage of the eighth transistor T2, Vdata represents the voltage of the display data signal, and VDD represents the first voltage.

In the pixel driving circuit, the transistor type of the first transistor T6 is opposite to the transistor type of the second transistor T11. When either of the first transistor T6 and the second transistor T11 is turned on, the current path may be formed, and the light emitting element 300 can be turned on. When a positive-negative alternating signal, a square wave, is applied to the gate of the first transistor T6 and the gate of the second transistor T11 at the same time, the first transistor T6 and the second transistor T11 are turned on alternately, and a current is always passed through the light emitting element 300.

Figure 6:
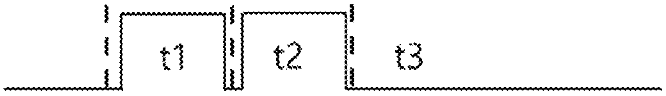
FIG. 6 is a timing diagram of a pulse width selection signal according to an embodiment of the present disclosure.
Figure 6:
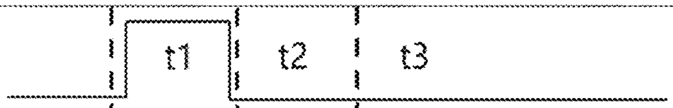
Figure 6:
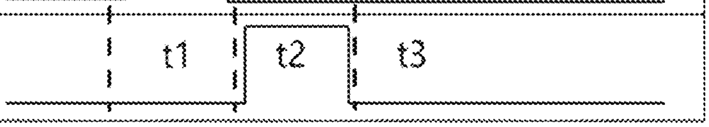

In an embodiment, the waveform of the pulse width modulation signal PWM is shown in FIG. 6, where a period of the pulse width modulation signal PWM is T and set to n(t1+t2), where n≥3 and is an integer multiple of 3. This makes it possible for the writing phases t1 and t2 not to undergo a signal transition during a high level or a low level period of the pulse width modulation signal PWM, so as to ensure data writing stability. In the embodiment shown in FIG. 6, the pulse width modulation signal PWM has a high level duration of ⅓*T and a low level duration of ⅔*T. Setting of a specific duration of the pulse width modulation signal PWM is related to the pulse width transition time corresponding to the grayscale.

Figure 7:
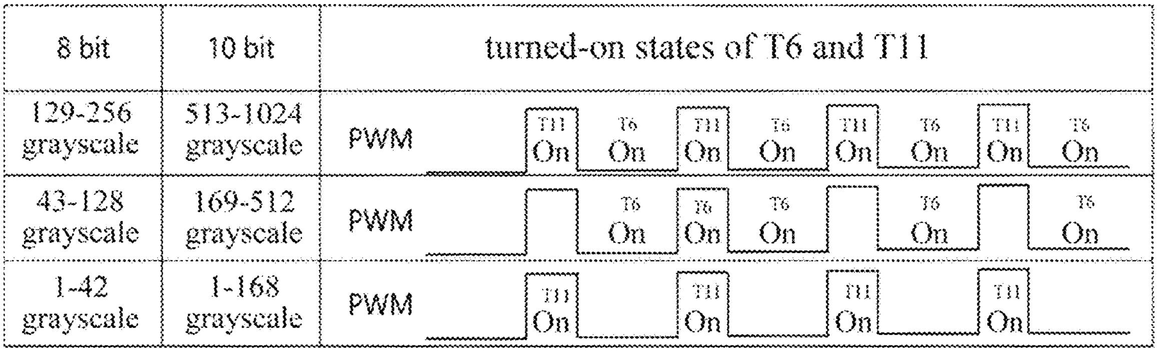
FIG. 7 is a schematic diagram of turned-on states of a first transistor and a second transistor in the pixel driving circuit in the embodiment of FIG. 6.

As shown in FIG. 7, which shows turned-on states of the first switching transistor T6 and the second switching transistor T11 in one frame period. When the grayscales are the 129-256 grayscales of 8 bit and the 513-1024 grayscales of 10 bit, the gates of the first switching transistor T6 and the second switching transistor T11 both are written with the pulse width modulation signal PWM signal, so that the first switching transistor T6 and the second switching transistor T11 are alternately turned on, a current path is formed at all times, and the sub-millimeter light emitting diode D is always emitting light. When the grayscales are the 43-128 grayscales of 8 bit and the 169-512 grayscales of 10 bit, only the gate of the first switching transistor T6 is written with the pulse width modulation signal PWM signal, and when the pulse width modulation signal PWM is at a low level, a current path is formed, so that the sub-millimeter light emitting diode D emits light only two thirds of the period. When the grayscales are the 1-43 grayscales of 8 bit and the 1-169 grayscales of 10 bit, only the gate of the second switching transistor T11 is written with the pulse width modulation signal PWM signal, and when the pulse width modulation signal PWM is at a high level, a current path is formed, so that the sub-millimeter light emitting diode D emits light only one thirds of the period.

The pixel driving circuit in the above-described embodiments are capable of driving the light emitting element 300 to display different grayscales at different durations according to pulse width selection signals corresponding to different grayscales. As a result, the light emitting element 300 may no longer be at a low current when the grayscale is displayed, thereby avoiding a picture flickering phenomenon occurring when the low grayscale is displayed. Further, since the pixel driving circuit can drive the light emitting element with three durations, the voltage gradient between the grayscales is improved, and the display effect and the display stability of the display panel are improved.

Figure 8:
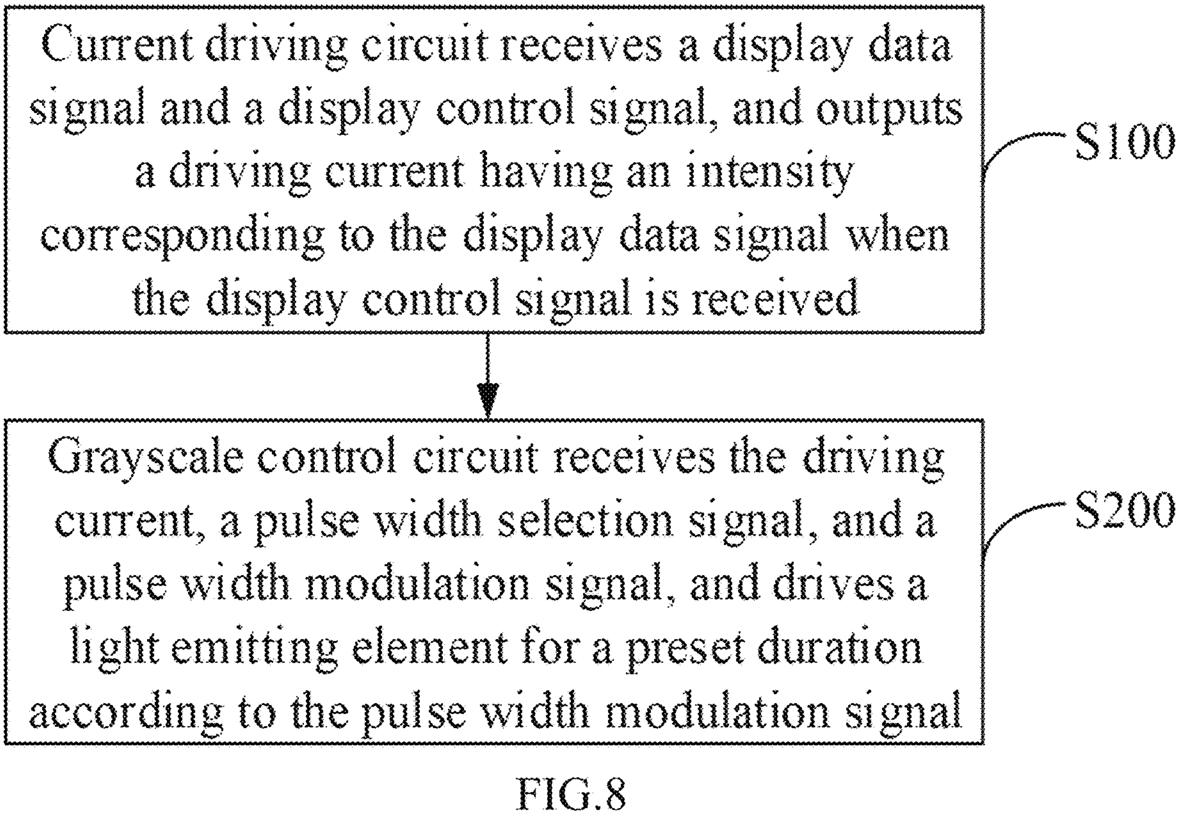
FIG. 8 is a schematic flow diagram of a pixel driving method according to an embodiment of the present disclosure.

In an embodiment, as shown in FIG. 8, there is provided a pixel driving method for the pixel driving circuit as described in the above-described embodiments. The pixel driving method includes following steps S100 and S200.

At the step S100, the current driving circuit receives a display data signal and a display control signal, and outputs a driving current having an intensity corresponding to the display data signal when the display control signal is received.

At the step S200, the grayscale control circuit receives the driving current, a pulse width selection signal, and a pulse width modulation signal, and drives a light emitting element for a preset duration according to the pulse width modulation signal. The preset duration is a first duration, a second duration, or a third duration corresponding to the pulse width selection signal.

The above pixel driving method can drive the light emitting element to display different grayscales at different durations according to the pulse width selection signals corresponding to the different grayscales, so that the light emitting element can no longer be at a low current when the grayscale is displayed, thereby avoiding a picture flickering phenomenon occurring when the low grayscale is displayed. The light emitting element can be driven with three durations, so that the voltage gradient between the grayscales is improved, and the display effect and the display stability of the display panel are improved.

In an embodiment, there is provided a display panel, including a plurality of light emitting elements and a plurality of pixel driving circuits each connected to corresponding one of the light emitting elements to drive the light emitting element. The configuration of each of the pixel driving circuits may be provided with reference to the embodiments described above, which are not repeatedly described again.

The pixel driving circuit, the pixel driving method, and the display panel can drive the light emitting element to display different grayscales at different durations according to pulse width selection signals corresponding to the different grayscales. As a result, the light emitting element may no longer be at a low current when the grayscale is displayed, thereby avoiding a picture flickering phenomenon occurring when the low grayscale is displayed and improving the display effect of the display panel in high and low grayscales. In addition, since the pixel driving circuit can drive the light emitting element with three durations, the voltage gradient between the grayscales is increased, and the display effect is better.

Any combination of the technical features in the foregoing embodiments may be performed. For brevity of description, all possible combinations of the technical features in the foregoing embodiments are not described. However, as long as there is no contradiction among the combination of the technical features, it should be considered as the scope described in this specification.

The above-described embodiments represent only a few implementations of the present disclosure, which are described in more detail and specifically, but are not therefore to be construed as limiting the scope of the patent disclosure. It should be noted that several variations and modifications may be made by those skilled in the art without departing from the spirit and scope of the present application. Accordingly, the scope of the present application should be governed by the appended claims.

What is claimed is:

1. A pixel driving circuit for driving a light emitting element, comprising:

a current driving circuit for receiving a display data signal and a display control signal, and outputting a driving current having an intensity corresponding to the display data signal when the display control signal is received; and a grayscale control circuit for receiving the driving current, a pulse width selection signal, and a pulse width modulation signal and driving the light emitting element for a preset duration based on the pulse width modulation signal, wherein the preset duration is a first duration, a second duration, or a third duration corresponding to the pulse width selection signal;

wherein the grayscale control circuit comprises a first pulse width selection circuit and a second pulse width selection circuit each for receiving the driving current, the pulse width selection signal, and the pulse width modulation signal; and the first pulse width selection circuit and the second pulse width selection circuit alternately drive the light emitting element for a total duration of the first duration based on the pulse width modulation signal under control of the pulse width selection signal; or the first pulse width selection circuit drives the light emitting element for the second duration based on the pulse width modulation signal under control of the pulse width selection signal; or the second pulse width selection circuit drives the light emitting element for the third duration based on the pulse width modulation signal under control of the pulse width selection signal, wherein the first duration is a sum of the second duration and the third duration.

2. The pixel driving circuit of claim 1, wherein the first pulse width selection circuit comprises: a first transistor and a first pulse width selection sub-circuit, wherein the first transistor is connected to the current driving circuit, the light emitting element, and the first pulse width selection sub-circuit, respectively, and the first pulse width selection sub-circuit is configured to receive the pulse width selection signal and the pulse width modulation signal and control the first transistor to turn on/off connection between the current driving circuit and the light emitting element based on the pulse width modulation signal under the control of the pulse width selection signal;

the second pulse width selection circuit comprises: a second transistor and a second pulse width selection sub-circuit, wherein the second transistor is connected to the current driving circuit, the light emitting element, and the second pulse width selection sub-circuit, respectively, and the second pulse width selection sub-circuit is configured to receive the pulse width selection signal and the pulse width modulation signal and control the second transistor to turn on/off connection between the current driving circuit and the light emitting element based on the pulse width modulation signal under the control of the pulse width selection signal; and the first transistor is a first type of transistor and the second transistor is a second type of transistor.

3. The pixel driving circuit of claim 2, wherein the first pulse width selection sub-circuit comprises: a third transistor, a fourth transistor, and a first capacitor, wherein an input terminal of the third transistor is configured to receive the pulse width selection signal, a controlled terminal of the third transistor is configured to receive a first scan signal, an output terminal of the third transistor is connected to a controlled terminal of the fourth transistor and a first terminal of the first capacitor, respectively, an input terminal of the fourth transistor is configured to receive the pulse width modulation signal, an output terminal of the fourth transistor is connected to the first transistor, and a second terminal of the first capacitor is configured to receive a voltage stabilizing signal.

4. The pixel driving circuit of claim 3, wherein the second pulse width selection sub-circuit comprises: a fifth transistor, a sixth transistor, and a second capacitor, wherein an input terminal of the fifth transistor is configured to receive the pulse width selection signal, a controlled terminal of the fifth transistor is configured to receive a second scan signal, and an output terminal of the fifth transistor is connected to a controlled terminal of the sixth transistor and a first terminal of the second capacitor, respectively, an input terminal of the sixth transistor is configured to receive the pulse width modulation signal, an output terminal of the sixth transistor is connected to the second transistor, and a second terminal of the second capacitor is configured to receive a voltage stabilizing signal.

5. The pixel driving circuit of claim 2, wherein the second pulse width selection sub-circuit comprises: a fifth transistor, a sixth transistor, and a second capacitor, wherein an input terminal of the fifth transistor is configured to receive the pulse width selection signal, a controlled terminal of the fifth transistor is configured to receive a second scan signal, and an output terminal of the fifth transistor is connected to a controlled terminal of the sixth transistor and a first terminal of the second capacitor, respectively, an input terminal of the sixth transistor is configured to receive the pulse width modulation signal, an output terminal of the sixth transistor is connected to the second transistor, and a second terminal of the second capacitor is configured to receive a voltage stabilizing signal.

6. The pixel driving circuit of claim 5, wherein the third transistor and the fifth transistor are of the same type.

7. The pixel driving circuit of claim 1, wherein:

the second duration is greater than or less than the third duration to perform three levels of grayscale adjustment;

or the second duration is equal to the third duration to perform two levels of grayscale adjustment.

8. A display panel, comprising: a plurality of light emitting elements and a plurality of pixel circuits each one for driving a corresponding one of the plurality of light emitting elements, wherein each of the plurality of pixel circuits comprises a pixel driving circuit of claim 1.

9. A pixel driving circuit for driving a light emitting element, comprising:

a current driving circuit for receiving a display data signal and a display control signal, and outputting a driving current having an intensity corresponding to the display data signal when the display control signal is received; and a grayscale control circuit for receiving the driving current, a pulse width selection signal, and a pulse width modulation signal and driving the light emitting element for a preset duration based on the pulse width modulation signal, wherein the preset duration is a first duration, a second duration, or a third duration corresponding to the pulse width selection signal;

wherein the current driving circuit comprises: a reset circuit, a writing compensation circuit, and a driving circuit; wherein the writing compensation circuit is connected to the reset circuit, the driving circuit, and the grayscale control circuit, respectively;

the reset circuit is configured to receive a reset signal and a first scan signal and reset the writing compensation circuit based on the first scan signal;

the writing compensation circuit is further configured to receive the display data signal and write the display data signal based on the second scan signal; and the driving circuit is configured to receive a first voltage and the display control signal and control the writing compensation circuit to output the driving current having the intensity corresponding to the display data signal based on the first voltage and the display control signal.

10. The pixel driving circuit of claim 9, wherein the writing compensation circuit comprises: a data writing transistor and a compensation sub-circuit, wherein a controlled terminal of the data writing transistor is configured to receive the second scan signal, an input terminal of the data writing transistor is configured to receive the display data signal, and an output terminal of the data writing transistor is connected to the compensation sub-circuit; and the compensation sub-circuit is connected to the driving circuit to receive the first voltage output by the driving circuit, and further configured to receive the second scan signal and perform voltage compensation based on the first voltage and the display data signal under control of the second scan signal.

11. The pixel driving circuit of claim 10, wherein the compensation sub-circuit comprises: a seventh transistor, an eighth transistor, and a third capacitor, wherein a controlled terminal of the seventh transistor is configured to receive the second scan signal, an input terminal of the seventh transistor is connected to an output terminal of the eighth transistor, an output terminal of the seventh transistor, a first terminal of the third capacitor and a controlled terminal of the eighth transistor are respectively connected to the reset circuit, a second terminal of the third capacitor is configured to receive a voltage stabilizing signal, and an input terminal of the eighth transistor is connected to an output terminal of the data writing transistor.

12. The pixel driving circuit of claim 11, wherein the reset circuit comprises: a reset transistor, wherein an input terminal of the reset transistor is connected to a reset signal inputting terminal for outputting the reset signal, a controlled terminal of the reset transistor is connected to a first scan signal inputting terminal for outputting the first scan signal, and an output terminal of the reset transistor is connected to the output terminal of the seventh transistor in the writing compensation circuit.

13. The pixel driving circuit of claim 11, wherein the driving circuit comprises: a driving transistor, wherein an input terminal of the driving transistor is connected to a first voltage terminal, a controlled terminal of the driving transistor is connected to a display control signal inputting terminal for outputting the display control signal, and an output terminal of the driving transistor is connected to the input terminal of the eighth transistor in the writing compensation circuit.

14. The pixel driving circuit of claim 9, wherein the pulse width modulation signal has a period $T=n((t1+t2))$, and $n\geq 3$ and is an integer multiple of 3, wherein t1 is a duration for a reset phase and t2 is a duration for a writing compensation phase.

15. The pixel driving circuit of claim 9, wherein the grayscale control circuit comprises a first pulse width selection circuit and a second pulse width selection circuit each for receiving the driving current, the pulse width selection signal, and the pulse width modulation signal; and the first pulse width selection circuit and the second pulse width selection circuit alternately drive the light emitting element for a total duration of the first duration based on the pulse width modulation signal under control of the pulse width selection signal; or the first pulse width selection circuit drives the light emitting element for the second duration based on the pulse width modulation signal under control of the pulse width selection signal; or the second pulse width selection circuit drives the light emitting element for the third duration based on the pulse width modulation signal under control of the pulse width selection signal, wherein the first duration is a sum of the second duration and the third duration.

16. The pixel driving circuit of claim 15, wherein the first pulse width selection circuit comprises: a first transistor and a first pulse width selection sub-circuit, wherein the first transistor is connected to the current driving circuit, the light emitting element, and the first pulse width selection sub-circuit, respectively, and the first pulse width selection sub-circuit is configured to receive the pulse width selection signal and the pulse width modulation signal and control the first transistor to turn on/off connection between the current driving circuit and the light emitting element based on the pulse width modulation signal under the control of the pulse width selection signal;

the second pulse width selection circuit comprises: a second transistor and a second pulse width selection sub-circuit, wherein the second transistor is connected to the current driving circuit, the light emitting element, and the second pulse width selection sub-circuit, respectively, and the second pulse width selection sub-circuit is configured to receive the pulse width selection signal and the pulse width modulation signal and control the second transistor to turn on/off connection between the current driving circuit and the light emitting element based on the pulse width modulation signal under the control of the pulse width selection signal; and the first transistor is a first type of transistor and the second transistor is a second type of transistor.

17. The pixel driving circuit of claim 16, wherein the first pulse width selection sub-circuit comprises: a third transistor, a fourth transistor, and a first capacitor, wherein an input terminal of the third transistor is configured to receive the pulse width selection signal, a controlled terminal of the third transistor is configured to receive a first scan signal, an output terminal of the third transistor is connected to a controlled terminal of the fourth transistor and a first terminal of the first capacitor, respectively, an input terminal of the fourth transistor is configured to receive the pulse width modulation signal, an output terminal of the fourth transistor is connected to the first transistor, and a second terminal of the first capacitor is configured to receive a voltage stabilizing signal.

18. The pixel driving circuit of claim 16, wherein the second pulse width selection sub-circuit comprises: a fifth transistor, a sixth transistor, and a second capacitor, wherein an input terminal of the fifth transistor is configured to receive the pulse width selection signal, a controlled terminal of the fifth transistor is configured to receive a second scan signal, and an output terminal of the fifth transistor is connected to a controlled terminal of the sixth transistor and a first terminal of the second capacitor, respectively, an input terminal of the sixth transistor is configured to receive the pulse width modulation signal, an output terminal of the sixth transistor is connected to the second transistor, and a second terminal of the second capacitor is configured to receive a voltage stabilizing signal.

19. A pixel driving method for driving a pixel driving circuit, wherein the pixel driving circuit comprises:

a current driving circuit for receiving a display data signal and a display control signal, and outputting a driving current having an intensity corresponding to the display data signal when the display control signal is received; and a grayscale control circuit for receiving the driving current, a pulse width selection signal, and a pulse width modulation signal and driving the light emitting element for a preset duration based on the pulse width modulation signal, wherein the preset duration is a first duration, a second duration, or a third duration corresponding to the pulse width selection signal, wherein the pixel driving method comprises:

the current driving circuit receiving the display data signal and the display control signal, and outputting the driving current having the intensity corresponding to the display data signal when the display control signal is received; and the grayscale control circuit receiving the driving current, the pulse width selection signal, and the pulse width modulation signal and driving the light emitting element for the preset duration based on the pulse width modulation signal, wherein the preset duration is the first duration, the second duration, or the third duration corresponding to the pulse width selection signal;

wherein the grayscale control circuit comprises a first pulse width selection circuit and a second pulse width selection circuit each for receiving the driving current, the pulse width selection signal, and the pulse width modulation signal; and the first pulse width selection circuit and the second pulse width selection circuit alternately drive the light emitting element for a total duration of the first duration based on the pulse width modulation signal under control of the pulse width selection signal; or the first pulse width selection circuit drives the light emitting element for the second duration based on the pulse width modulation signal under control of the pulse width selection signal; or the second pulse width selection circuit drives the light emitting element for the third duration based on the pulse width modulation signal under control of the pulse width selection signal, wherein the first duration is a sum of the second duration and the third duration.

* * * * *